(12) United States Patent
Maeda et al.

(10) Patent No.: US 12,175,309 B2
(45) Date of Patent: Dec. 24, 2024

(54) NOTIFICATION CONTROL CONSIDERING REMOTE WORK CONCENTRATION OF OPERATOR

(71) Applicant: KYNDRYL, INC., New York, NY (US)

(72) Inventors: Keisuke Maeda, Itabashi-ku (JP); Takashi Yanagisawa, Setagaya-ku (JP)

(73) Assignee: Kyndryl, Inc., New York, NY (US)

( * ) Notice: Subject to any disclaimer, the term of this patent is extended or adjusted under 35 U.S.C. 154(b) by 557 days.

(21) Appl. No.: 17/504,679

(22) Filed: Oct. 19, 2021

(65) Prior Publication Data

US 2023/0121075 A1 Apr. 20, 2023

(51) Int. Cl.
*G06F 9/54* (2006.01)

(52) U.S. Cl.
CPC .................................. *G06F 9/542* (2013.01)

(58) Field of Classification Search
CPC ...... G06F 1/329; G06F 9/4843; G06F 9/4881; G06F 9/4887; G06F 9/542; G06F 9/546; G06F 16/1734
See application file for complete search history.

(56) References Cited

U.S. PATENT DOCUMENTS

| 7,743,340 | B2 * | 6/2010 | Horvitz | H04L 67/75 715/710 |
| 8,924,497 | B2 | 12/2014 | Sheridan et al. | |
| 9,400,551 | B2 | 7/2016 | Ashbrook et al. | |
| 10,491,962 | B2 * | 11/2019 | Siddiq | G06F 9/542 |
| 11,080,108 | B2 * | 8/2021 | Ghosh | G06F 9/542 |
| 2014/0129661 | A1 * | 5/2014 | Thyagaraja | H04L 51/224 709/207 |
| 2018/0176885 | A1 * | 6/2018 | VanBlon | H04W 4/02 |
| 2021/0090419 | A1 * | 3/2021 | Roberts | A61B 5/7455 |

FOREIGN PATENT DOCUMENTS

| JP | 2014123826 A | 7/2014 |
| JP | 6061079 B2 | 1/2017 |
| JP | 2020038542 A | 3/2020 |

OTHER PUBLICATIONS

Tanaka et al., "Study of User Uninterruptibility Estimation based on focused Application-Switching", Graduate School, Tokyo University of Agriculture and Technology, 11 pages.
Unknown, "System and Method of User Notification Management for Distraction Reduction", IP.com No. IPCOM000252810D, Feb. 14, 2018, 3 pages.
Mell et al., "The NIST Definition of Cloud Computing", NIST, Special Publication 800-145, Sep. 2011, 7 pages.

* cited by examiner

*Primary Examiner* — Andy Ho
(74) *Attorney, Agent, or Firm* — Erik Swanson; Andrew D. Wright; Calderon Safran & Wright P.C.

(57) ABSTRACT

A method, including: receiving, by a computing device, an electronic notification directed to a user of an electronic device; generating, by the computing device, an initial uninterruptibility score based on a current work mode of the user, generating, by the computing device, an initial necessity score based on current attributes of the notification; comparing, by the computing device, the initial uninterruptibility score and the initial necessity score; and preventing, by the computing device and as a result of the comparing, the notification from being presented to the user.

20 Claims, 17 Drawing Sheets

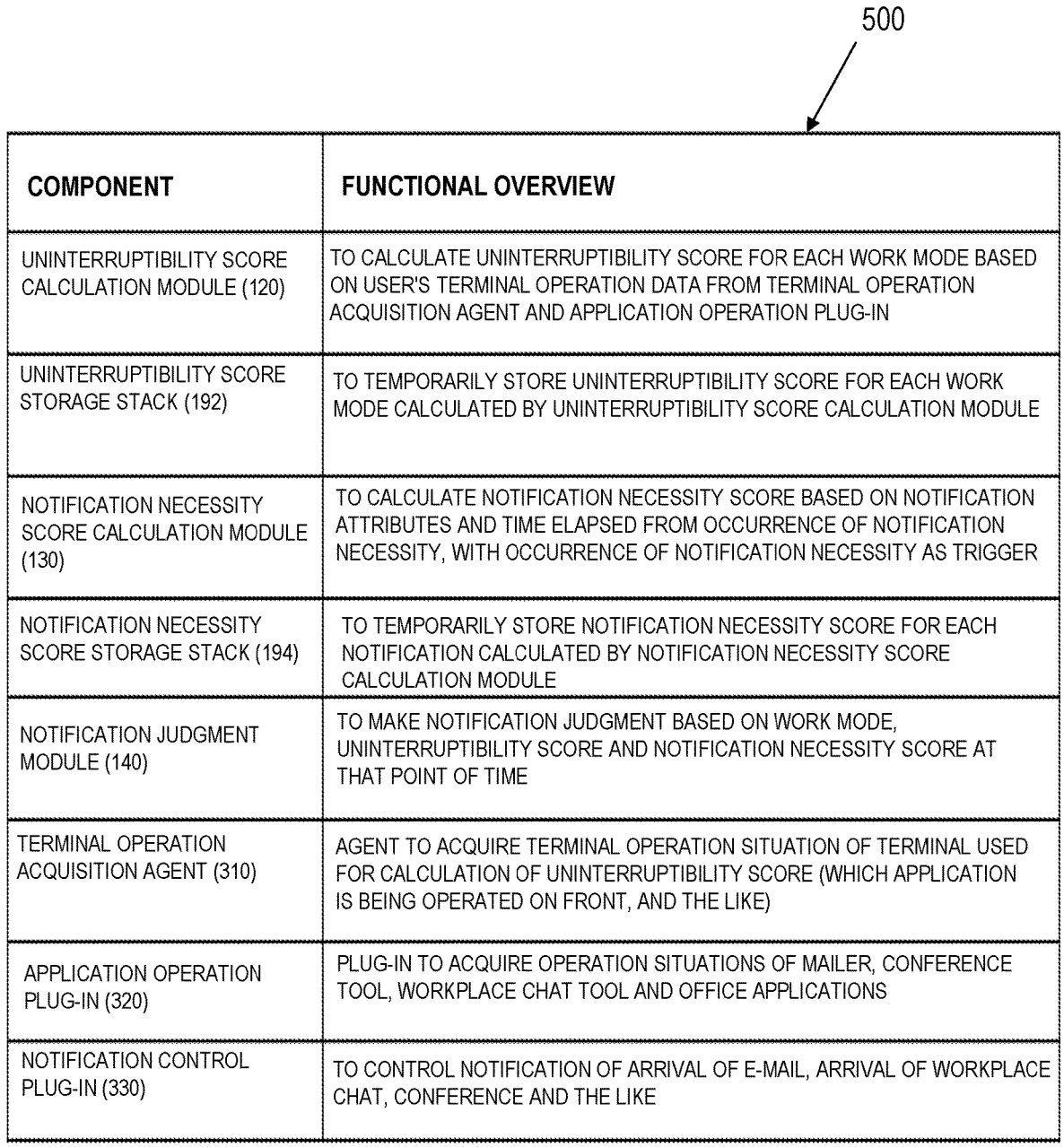

| COMPONENT | FUNCTIONAL OVERVIEW |
|---|---|
| UNINTERRUPTIBILITY SCORE CALCULATION MODULE (120) | TO CALCULATE UNINTERRUPTIBILITY SCORE FOR EACH WORK MODE BASED ON USER'S TERMINAL OPERATION DATA FROM TERMINAL OPERATION ACQUISITION AGENT AND APPLICATION OPERATION PLUG-IN |
| UNINTERRUPTIBILITY SCORE STORAGE STACK (192) | TO TEMPORARILY STORE UNINTERRUPTIBILITY SCORE FOR EACH WORK MODE CALCULATED BY UNINTERRUPTIBILITY SCORE CALCULATION MODULE |
| NOTIFICATION NECESSITY SCORE CALCULATION MODULE (130) | TO CALCULATE NOTIFICATION NECESSITY SCORE BASED ON NOTIFICATION ATTRIBUTES AND TIME ELAPSED FROM OCCURRENCE OF NOTIFICATION NECESSITY, WITH OCCURRENCE OF NOTIFICATION NECESSITY AS TRIGGER |
| NOTIFICATION NECESSITY SCORE STORAGE STACK (194) | TO TEMPORARILY STORE NOTIFICATION NECESSITY SCORE FOR EACH NOTIFICATION CALCULATED BY NOTIFICATION NECESSITY SCORE CALCULATION MODULE |
| NOTIFICATION JUDGMENT MODULE (140) | TO MAKE NOTIFICATION JUDGMENT BASED ON WORK MODE, UNINTERRUPTIBILITY SCORE AND NOTIFICATION NECESSITY SCORE AT THAT POINT OF TIME |
| TERMINAL OPERATION ACQUISITION AGENT (310) | AGENT TO ACQUIRE TERMINAL OPERATION SITUATION OF TERMINAL USED FOR CALCULATION OF UNINTERRUPTIBILITY SCORE (WHICH APPLICATION IS BEING OPERATED ON FRONT, AND THE LIKE) |
| APPLICATION OPERATION PLUG-IN (320) | PLUG-IN TO ACQUIRE OPERATION SITUATIONS OF MAILER, CONFERENCE TOOL, WORKPLACE CHAT TOOL AND OFFICE APPLICATIONS |
| NOTIFICATION CONTROL PLUG-IN (330) | TO CONTROL NOTIFICATION OF ARRIVAL OF E-MAIL, ARRIVAL OF WORKPLACE CHAT, CONFERENCE AND THE LIKE |

| CATEGORY | INPUT | RESPONSE TO CHANGE IN UNINTERRUPTIBILITY | UNINTERRUPTIBILITY |
|---|---|---|---|
| (1) Uninterruptibility of Whole Conference | - Occurrence of Statement by Person Other Than User<br>- Change in Projection Screen | Calculate Moving Average of Occurrences of Input Information per Unit Time | Uninterruptibility (1) |
| (2) Item Influencing Uninterruptibility Based on Change in Conference State | - Switching of Person Projected on Screen (Physical Change)<br>- Detection of Keyword Related to Change in Theme of Conference | - Immediate Change to Acceptable State<br>- Increase in Uninterruptibility with Elapse of Time | Uninterruptibility (2) |
| (3) Item of Uninterruptibility Related to User | - Occurrence of Statement by User<br>- Detection of User's Name | - Immediate Execution of Rejection<br>- Decrease in Uninterruptibility with Elapse of time after Disablement of Input | Uninterruptibility (3) |

FIG. 11

FIG. 12
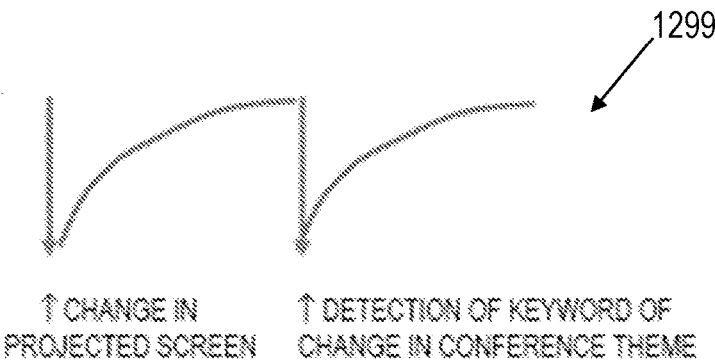
↑ CHANGE IN PROJECTED SCREEN  ↑ DETECTION OF KEYWORD OF CHANGE IN CONFERENCE THEME
FIG. 13
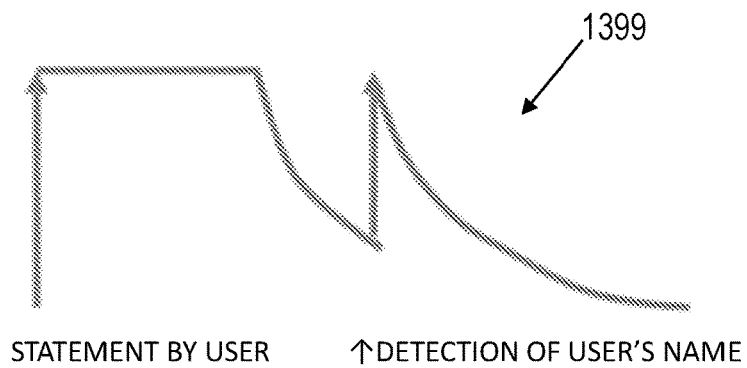
STATEMENT BY USER  ↑ DETECTION OF USER'S NAME
| PHASE / TARGET OBJECT | OBJECT OPEN (WORK START) | OBJECT CLOSE (WORK END) |
|---|---|---|
| 1. E-MAIL | START WRITING OF E-MAIL | TRANSMIT E-MAIL |
| 2. VARIOUS KINDS OF DOCUMENTATION WORKS → OFFICE FILE OBJECT | OBJECT OPEN | OBJECT CLOSE |
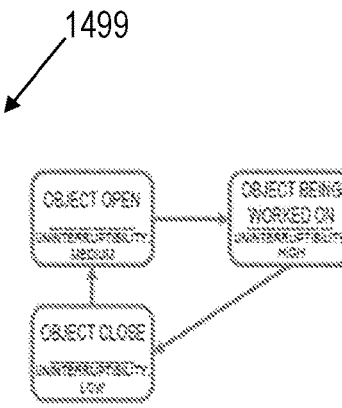
FIG. 14

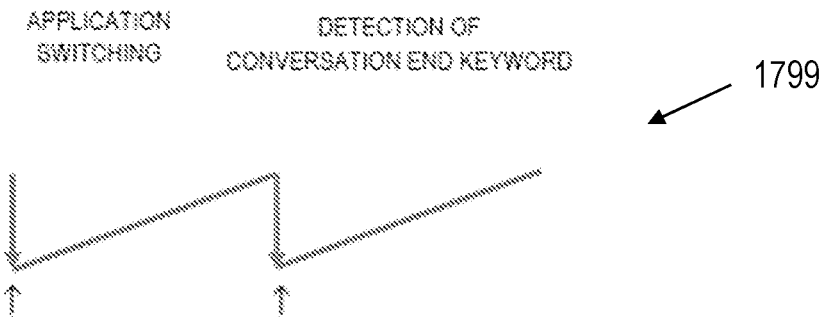

FIG. 17

| NOTIFICATION TYPE | CHARACTERISTIC | RESPONSIVENESS TO ELAPSE OF TIME |
|---|---|---|
| Email | Increases with time | Small, Change with Time is Gradual |
| Workplace Chat | Highest When Notification Necessity Occurs and Decreases with Time | Large, Change with Time is Abrupt |
| Others | | |
| Conference Notification | Increases with Time until Conference Start Time | Small, Change with Time is Gradual |

FIG. 18

NOTIFICATION CONTROL CONSIDERING REMOTE WORK CONCENTRATION OF OPERATOR

BACKGROUND

Aspects of the present invention relate generally to notification systems for electronic devices and, more particularly, to notification timing based on uninterruptibility and necessity.

The number of people engaged in remote work (hereinafter referred to simply as workers) has been rapidly increasing. In contrast with a few years ago, the workers have been in a form of continuously using information technology (IT) terminals for a long time without movement due to an increase in the number of remote conferences and other work. During use of the IT terminals, a large number of various types of notifications occur.

SUMMARY

In a first aspect of the invention, there is a computer-implemented method including: receiving, by a computing device, an electronic notification directed to a user of an electronic device; generating, by the computing device, an initial uninterruptibility score based on a current work mode of the user; generating, by the computing device, an initial necessity score based on current attributes of the notification; comparing, by the computing device, the initial uninterruptibility score and the initial necessity score; and preventing, by the computing device and as a result of the comparing, the notification from being presented to the user.

In another aspect of the invention, there is a computer program product including one or more computer readable storage media having program instructions collectively stored on the one or more computer readable storage media. The program instructions are executable to: receive an electronic notification directed to a user of an electronic device; generate an initial uninterruptibility score based on a current work mode of the user; generate an initial necessity score based on current attributes of the notification; compare the initial uninterruptibility score and the initial necessity score; prevent, as a result of the comparing, the notification from being presented to the user; generate, at an update time, an updated uninterruptibility score based on an updated work mode of the user; generate, at the update time, an updated necessity score based on updated attributes of the notification; compare the updated uninterruptibility score and the updated necessity score; and periodically repeat the generating the updated uninterruptibility score, the generating the updated necessity score, and the comparing the updated uninterruptibility score and the updated necessity score until the updated necessity score is larger than the updated uninterruptibility score.

In another aspect of the invention, there is system including a processor, a computer readable memory, one or more computer readable storage media, and program instructions collectively stored on the one or more computer readable storage media. The program instructions are executable to: receive an electronic notification directed to a user of an electronic device; generate an initial uninterruptibility score based on a current work mode of the user; generate an initial necessity score based on current attributes of the notification; compare the initial uninterruptibility score and the initial necessity score; and prevent, as a result of the comparing, the notification from being presented to the user.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 6 shows a chart of components in accordance with aspects of the invention.

FIG. 11 shows a chart of uninterruptibility in accordance with aspects of the invention.

FIG. 12 shows a graph showing changes in uninterruptibility in accordance with aspects of the invention.

FIG. 13 shows a graph showing changes in uninterruptibility in accordance with aspects of the invention.

FIG. 14 shows a table showing tendencies in uninterruptibility in accordance with aspects of the invention.

FIG. 17 shows a graph showing change in uninterruptibility in accordance with aspects of the invention.

FIG. 18 shows a chart of notification necessity in accordance with aspects of the invention.

DETAILED DESCRIPTION

Figure 1:
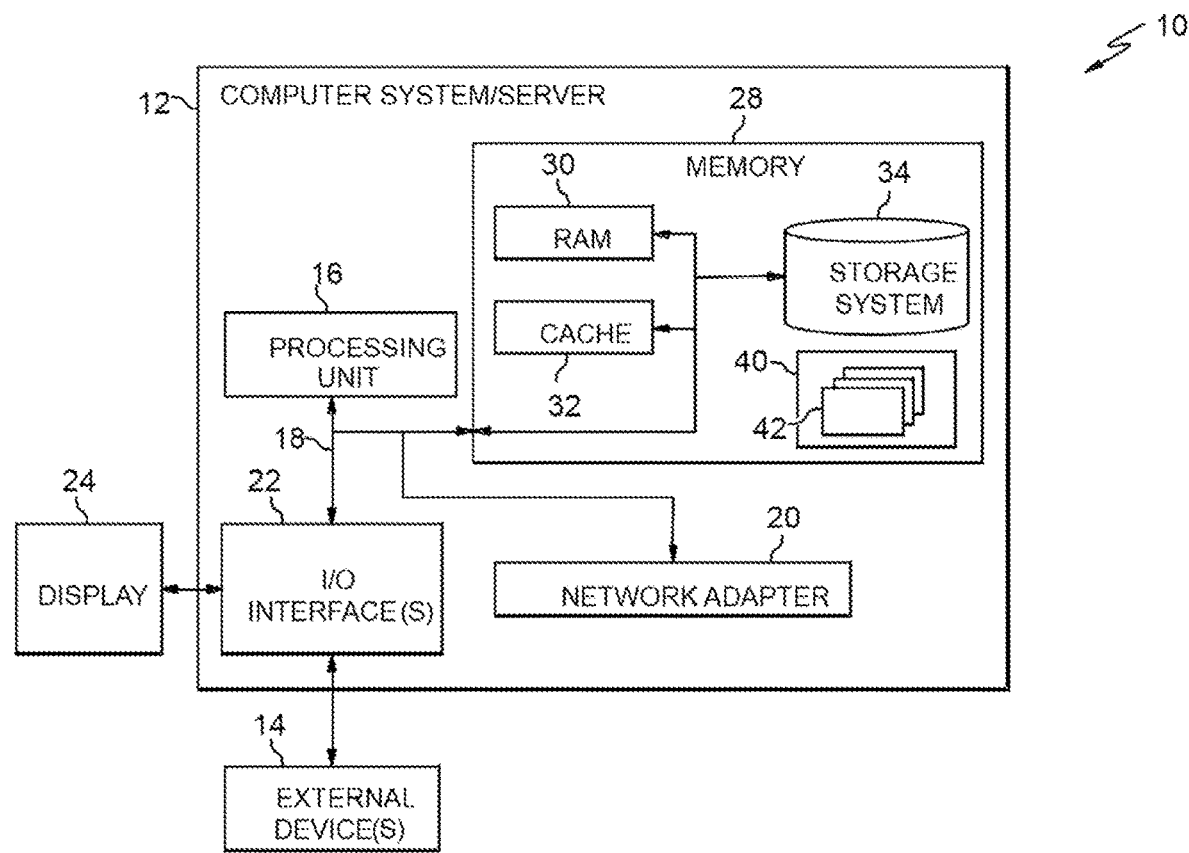
FIG. 1 depicts a cloud computing node according to an embodiment of the present invention.

Aspects of the present invention relate generally to notification systems for electronic devices and, more particularly, to notification timing based on uninterruptibility and necessity. According to aspects of the invention an electronic notification sent to a user of an electronic terminal is received, and an uninterruptibility score and a notification necessity score are calculated and compared. In embodiments, as a result of the uninterruptibility score being higher than the notification necessity score, the notification is prevented from being presented to the user. In this manner, implementations of the invention prevent a user from being interrupted by notifications that are determined to be less important than work currently being performed by the user on the terminal.

Embodiments of the invention include a computer implementation method comprising following steps: acquiring event information whose event requires notification; determining an event type based on the event information; continuously calculating a notification necessity level based on the event type and the event information; acquiring terminal operation data; determining an operation mode based on the operation data; continuously calculating an uninterruptibility level based on the operation mode and the operation data; determining notification timing based on a notification necessity level change and an uninterruptibility level change; and notifying at the notification timing.

The large number of electronic notifications received by users of information technology terminals involves a high cost in computing resources. The high cost of computing resources typically reduces the performance of the terminal in that the user is often opening and closing applications to read the notifications. Implementations of the invention address this technological problem with the technological solution of generating a uninterruptibility score and a notification necessity score, and comparing the scores to determine if presentation to the user of a particular notification should be delayed. By reducing the number of transitions between various applications on the terminal, implementations of the invention reduce the cost of computing resources.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (Saas): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
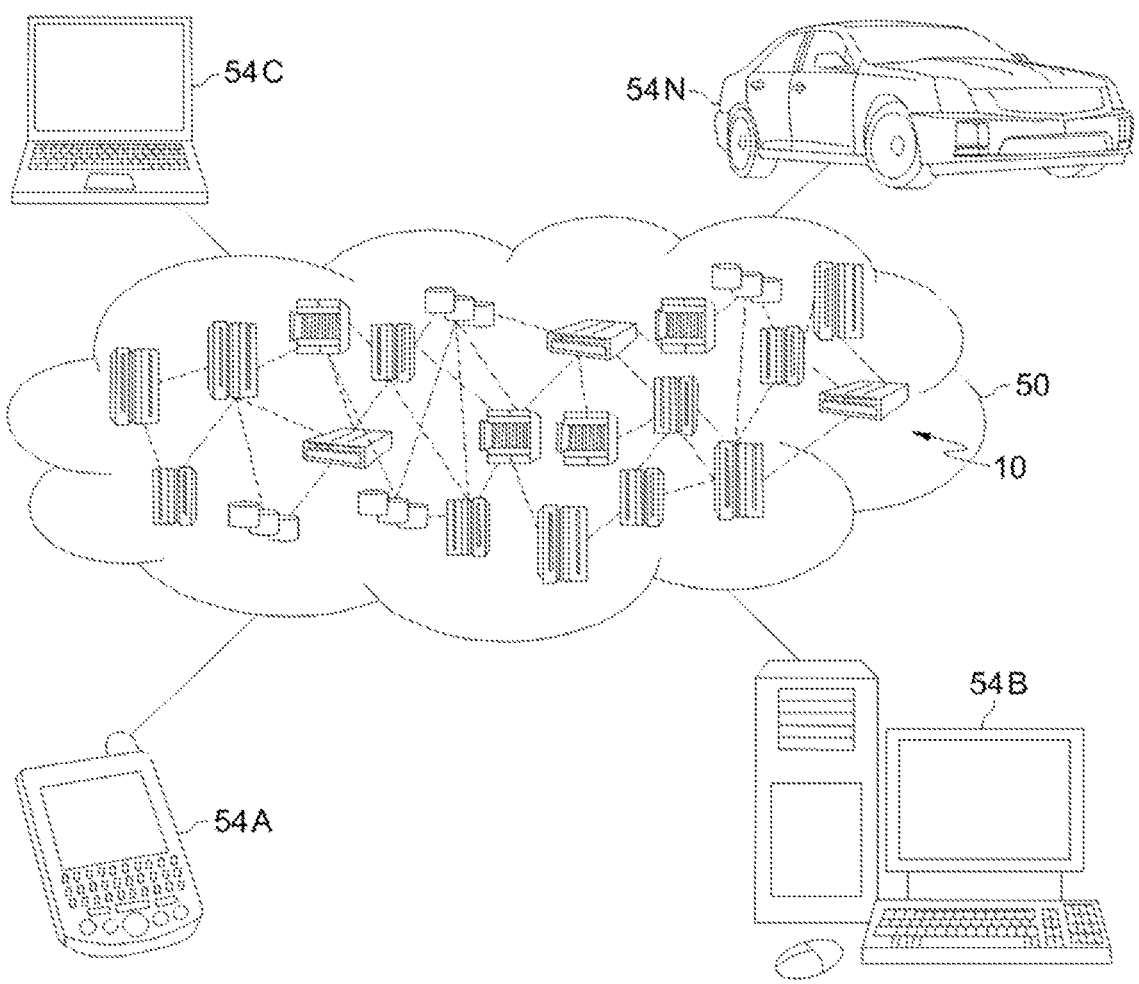
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
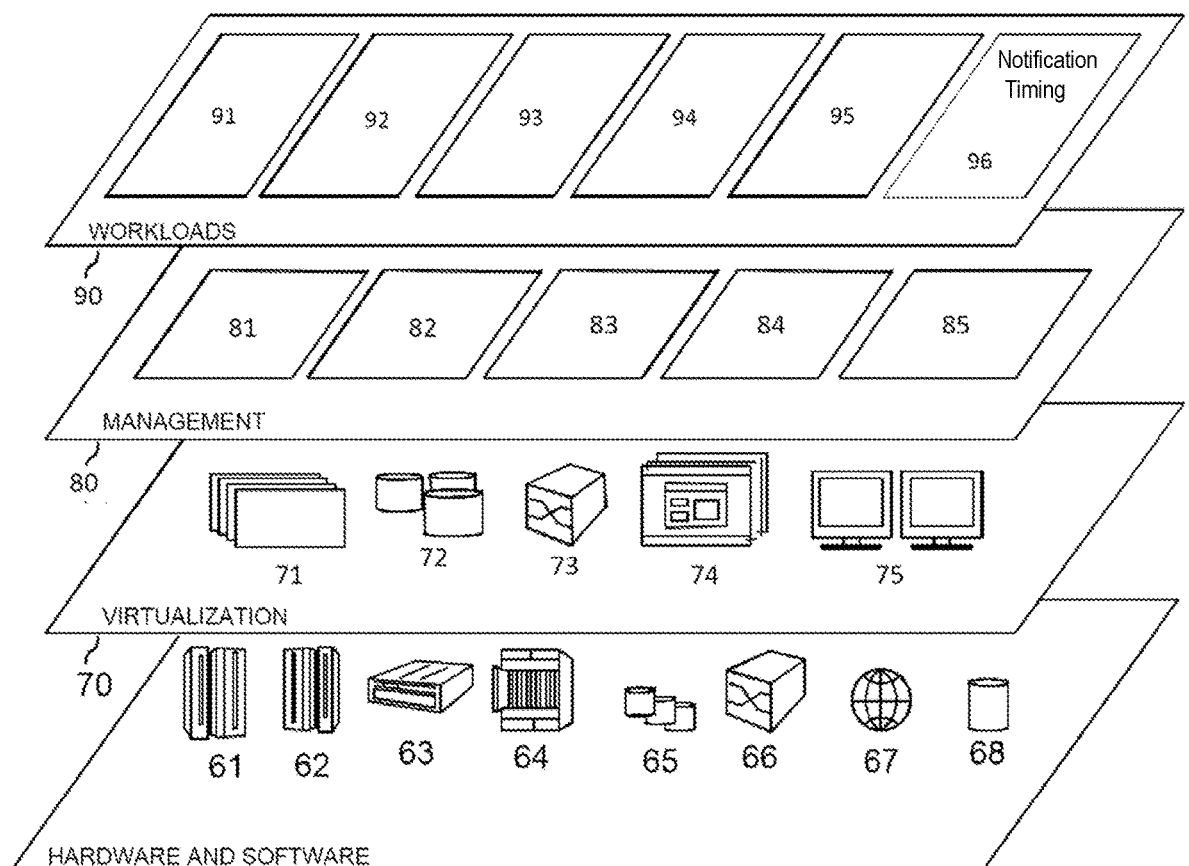
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and notification timing 96.

Implementations of the invention may include a computer system/server 12 of FIG. 1 in which one or more of the program modules 42 are configured to perform (or cause the computer system/server 12 to perform) one of more functions of the notification timing 96 of FIG. 3. For example, the one or more of the program modules 42 may be configured to: receive an electronic notification directed to a user of an electronic device; generate an initial uninterruptibility score based on a current work mode of the user; generate an initial necessity score based on current attributes of the notification; compare the initial uninterruptibility score and the initial necessity score; and determine, as a result of the comparing, that the notification is not to be presented to the user.

The number of people engaged in remote work (hereinafter referred to simply as workers) has been rapidly increasing due to the COVID-19 pandemic. In comparison with the situation before the COVID-19 pandemic, many workers have been continuously using information technology (IT) terminals for extended periods of time without movement due to an increase in the number of remote conferences and the like.

During use of IT terminals, various types of notifications occur. These notifications sometimes disturb concentration of the workers, which can lead to a decrease in work efficiency. As examples of methods for controlling notification according to states of an IT terminal user, the following cases exist: notification control based on time; night mode of smart phones and the like (notification during a certain defined period of time, such as nighttime, is restricted; notification control according to states of a user; and notification control during driving of a car. However, none of the above contributes to implement notification at a favorable timing according to the state of the workers activity and concentrating condition at an IT terminal. In these examples, the notification timing is not controlled according to the degree of urgency of activity of the next process.

Embodiments of the present invention, by implementing notification to an IT terminal user at such an appropriate timing that does not significantly disturb a concentration state of the worker, while he/she is performing work, maintain the state of the IT terminal user concentrating on their work and improve work efficiency.

In embodiments, in order to implement notification to an IT terminal user at such an appropriate timing that does not significantly disturb a concentration state of the worker, two indicator values are generated that change according to the time lapse. By calculating and comparing these indicator values to calculate a notification timing and implement notification while the worker is working, notification at a favorable timing according to the worker's working state is realized.

One of the two indicator values is an uninterruptibility score. Since uninterruptibility changes according to states (modes) of work, the work modes are defined and managed. A level at which a sent notification does not disturb the worker's concentration is defined based on a plurality of pieces of information showing various work states (modes) of the worker. In embodiments, work to which most importance is attached (among a plurality of multi-tasking works) is defined as "main work". Based on the work state (mode) of this "main work", embodiments calculate an assumed work interruption tolerance level.

The other of the two indicator values is a notification necessity score. The degree of notification necessity changes according to a plurality of attributes about the notification. Therefore, in embodiments, the degree of notification necessity is calculated based on attributes of each notification to use the degree of notification necessity for calculation of a notification timing.

Embodiments continuously calculate the uninterruptibility score and the notification necessity score while the worker is working and compare the two indicator values, and then implement notification at an optimum timing. As shown in graph 499 in FIG. 4, when the notification necessity score equals (or is greater than) the uninterruptibility score, embodiments implement notification.

Figure 5:
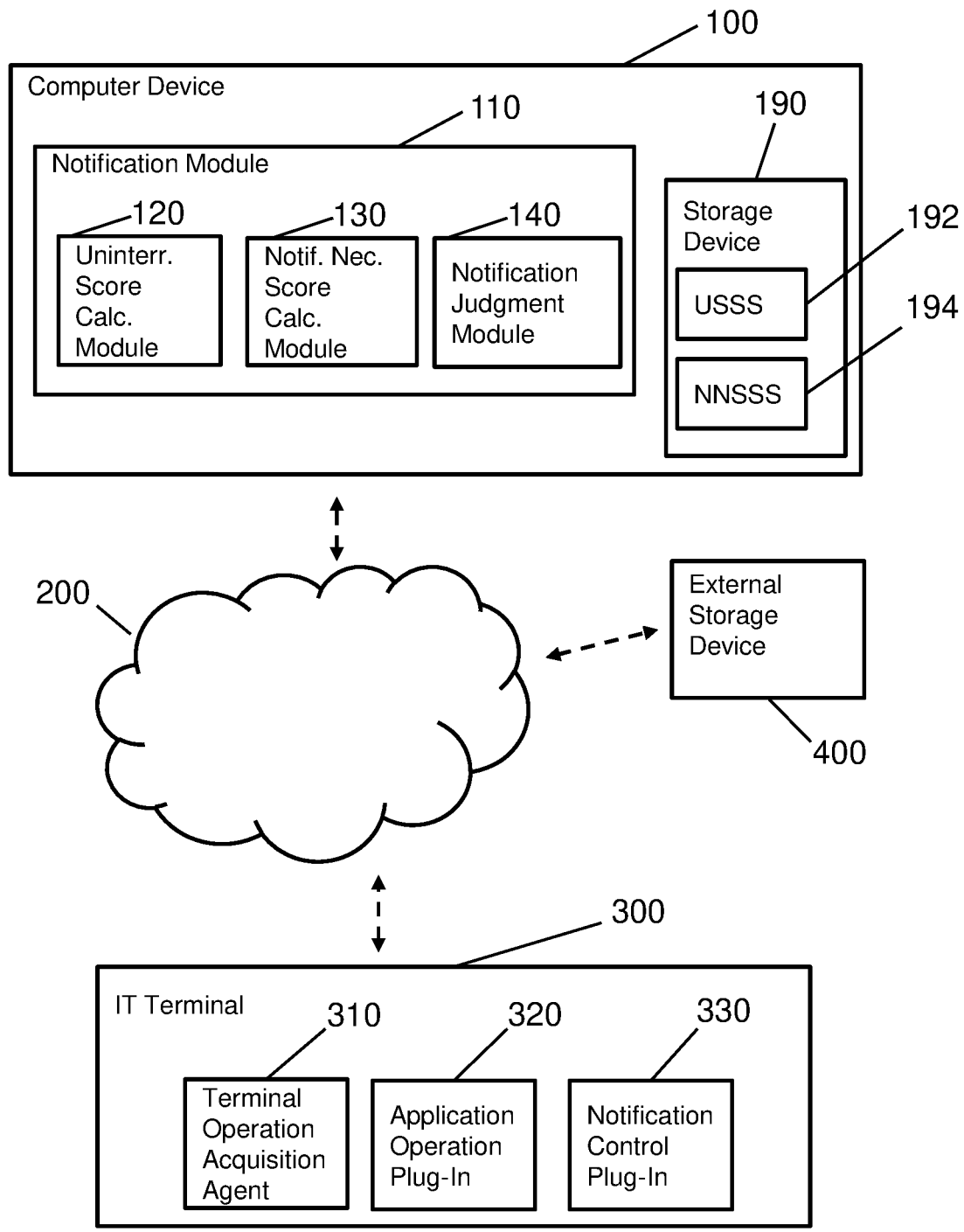
FIG. 5 shows a block diagram of an exemplary environment in accordance with aspects of the invention.

FIG. 5 shows a block diagram of an exemplary environment in accordance with aspects of the invention. In embodiments, the environment includes a computer device 100 such as, for example, computer system/server 12 in FIG. 1, that communicates over one or more networks 200 such as, for example, cloud computing environment 50 of FIG. 2. In this example, computer device 100 includes a notification module 110, for example, one or more of program modules 42 in FIG. 1, and a storage device 190 such as, for example, storage system 34 in FIG. 1. In this example, notification module 110 includes an uninterruptibility score calculation module 120, a notification score calculation module 130, a notification judgment module 140. Computer device 100 may include additional or fewer modules than those shown in FIG. 5. In embodiments, separate modules may be integrated into a single module. Additionally, or alternatively, a single module may be implemented as multiple modules. Moreover, the quantity of devices and/or networks in the environment is not limited to what is shown in FIG. 5. In practice, the environment may include additional devices and/or networks; fewer devices and/or networks; different devices and/or networks; or differently arranged devices and/or networks than illustrated in FIG. 5.

Figure 4:
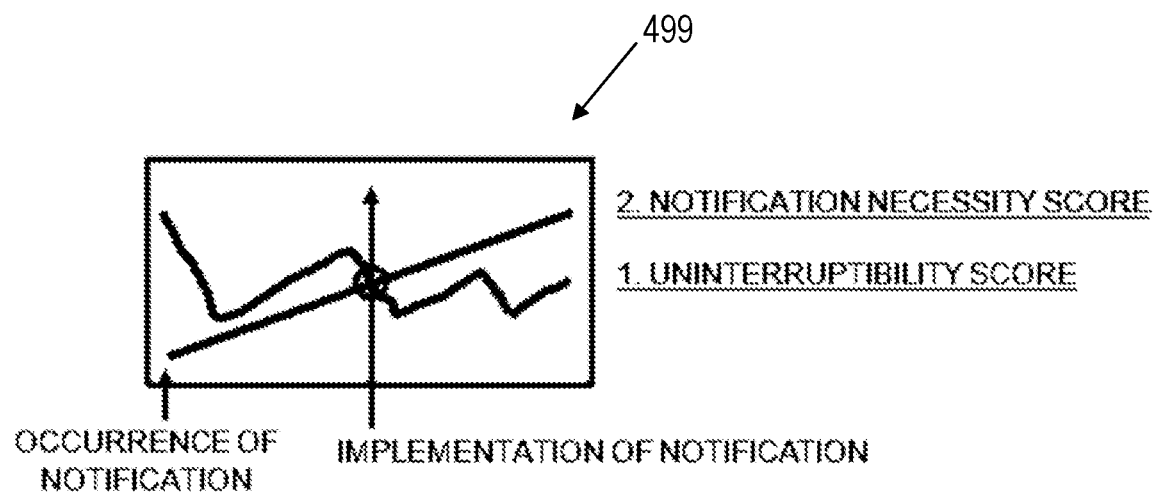
FIG. 4 shows a graph showing an intersection of notification necessity score and uninterruptibility score in accordance with aspects of the invention.

FIG. 5 shows an IT terminal 300 such as, for example, a computer system having some or all of the features of computer system/server 12 in FIG. 1, that interacts with notification module 110. In embodiments, notification module 110 determines an appropriate, or optimum, time to notify a user of IT terminal 300 of the arrival of a notification. In this example, IT terminal 300 includes a terminal operation acquisition agent 310, an application operation plug-in 320, and a notification control plug-in 330 (examples of all described in detail, below). In embodiments, more IT terminals such as, for example, computer systems having some or all of the features of computer system/server 12 in FIG. 1, interact with notification module 110. FIG. 4 also shows an external storage device 400 such as, for example, another computer device having some or all of the features of computer system/server 12 in FIG. 1, that is external to computer device 100 and contains data useful to notification module 110 such as for example, uninterruptibility score storage stack 192 and notification necessity score storage stack 194 shown in FIG. 5. In embodiments, one or more databases or other information that are accessed or stored by notification module 110 is stored on storage device 120. In embodiments, some or all of the databases or other information that are accessed or stored by notification module 110 is stored on storage device 120 and/or external storage device 400. In this example, storage device 190 includes a uninterruptibility score storage stack 192 and a notification necessity score storage stack 194 (examples of both discussed in detail, below).

FIG. 6 is a chart showing an exemplary functional overview for each component of computer device 100 shown in FIG. 5. In the example shown in FIG. 6, uninterruptibility score calculation module 120 calculates an uninterruptibility score for each work mode based on a user's terminal operation data from terminal operation acquisition agent 150 and application operation plug-in 160. In this example, uninterruptibility score storage stack 192 temporarily stores the uninterruptibility score for each work mode calculated by uninterruptibility score calculation module 120. In this example, notification necessity score calculation module 130 calculates a notification necessity score based on notification attributes and a time elapsed from occurrence of the notification necessity, with the occurrence of notification necessity being a trigger for the calculation. In this example, notification necessity score storage stack 194 temporarily stores the notification necessity score for each notification calculated by notification necessity score calculation module 130. In this example, notification judgment module 140 makes a notification judgment based on work mode, uninterruptibility score, and notification necessity score. In this example, terminal operation acquisition agent 150 acquires a terminal operation situation of IT terminal 300 used by uninterruptibility score calculation module 120 to calculate the uninterruptibility score. In this example, application operation plug-in 160 acquires operation situations of an emailer, a conference tool, a workplace chat tool, and/or office applications used by uninterruptibility score calculation module 120 to calculate the uninterruptibility score. In this example, notification control plug-in 170 controls notification of the user of IT terminal 300 of arrival of email, workplace chats, conferences at a notification time determined by notification judgment module 140.

Figure 7:
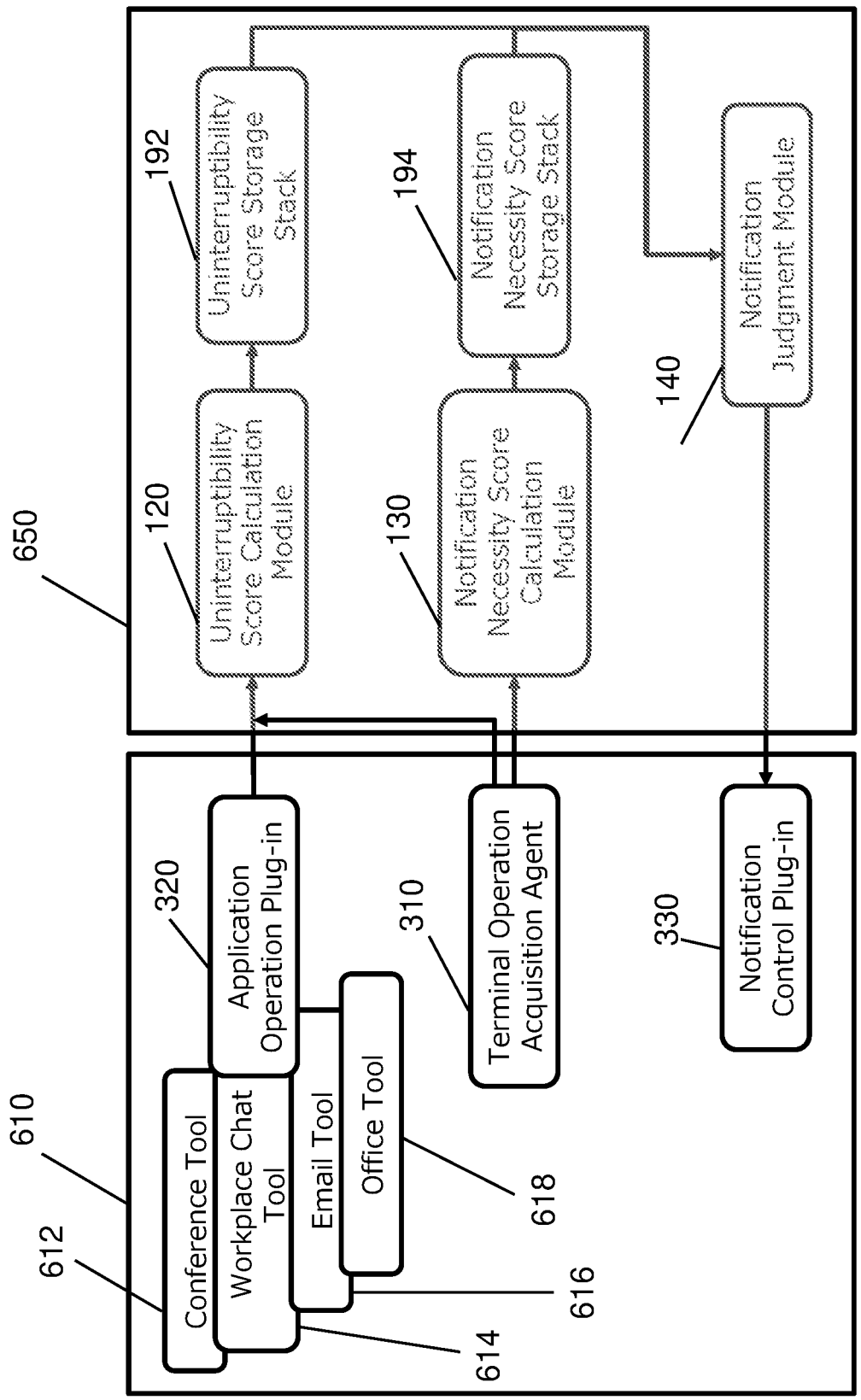
FIG. 7 shows a block diagram of an exemplary environment in accordance with aspects of the invention.

In embodiments, components of the invention are roughly divided into two types of components: a part for acquiring a processing situation of an operation terminal or performing notification control; and a part for calculating uninterruptibility and notification necessity based on acquired data, temporarily store the uninterruptibility and the notification necessity and make a notification judgment. FIG. 7 shows an example of such an embodiment.

In FIG. 7, part 610 includes components that are arranged in an operation target terminal (such as, for example IT terminal 300) and part 650 includes components arranged in an operation terminal or server connected to an operation terminal (such as, for example, computer device 100). In this example, part 610 includes various tools, or applications, that are resident on, or accessible by, IT terminal 300 and used by a user of IT terminal 300. In this example, these tools include a conference tool 612, a workplace chat tool 614, an email tool 616, and an office tool 618 that are configured to receive notifications. In the example in FIG. 7, application operation plug-in 320 facilitates communication between tools 612, 614, 616, 618 and uninterruptibility score calculation module 120 such that uninterruptibility score calculation module 120 receives operation situations from tools 612, 614, 616, 618 that it uses to calculate an uninterruptibility score, as shown in FIG. 6. In the example in FIG. 7, terminal operation acquisition agent 310 acquires a terminal operation situation which is used by notification necessity score calculation module 130 in calculating a notification necessity score, as shown in FIG. 6. In the example in FIG. 7, notification control plug-in 330 receives instructions from notification judgement module 140 and controls when the notification is presented to the user of IT terminal 300.

In the example shown in FIG. 7, part 650 includes uninterruptibility score calculation module 120, uninterruptibility score storage stack 192, notification score calculation module 130, notification necessity score storage stack 194, and notification judgment module 140.

Figure 8:
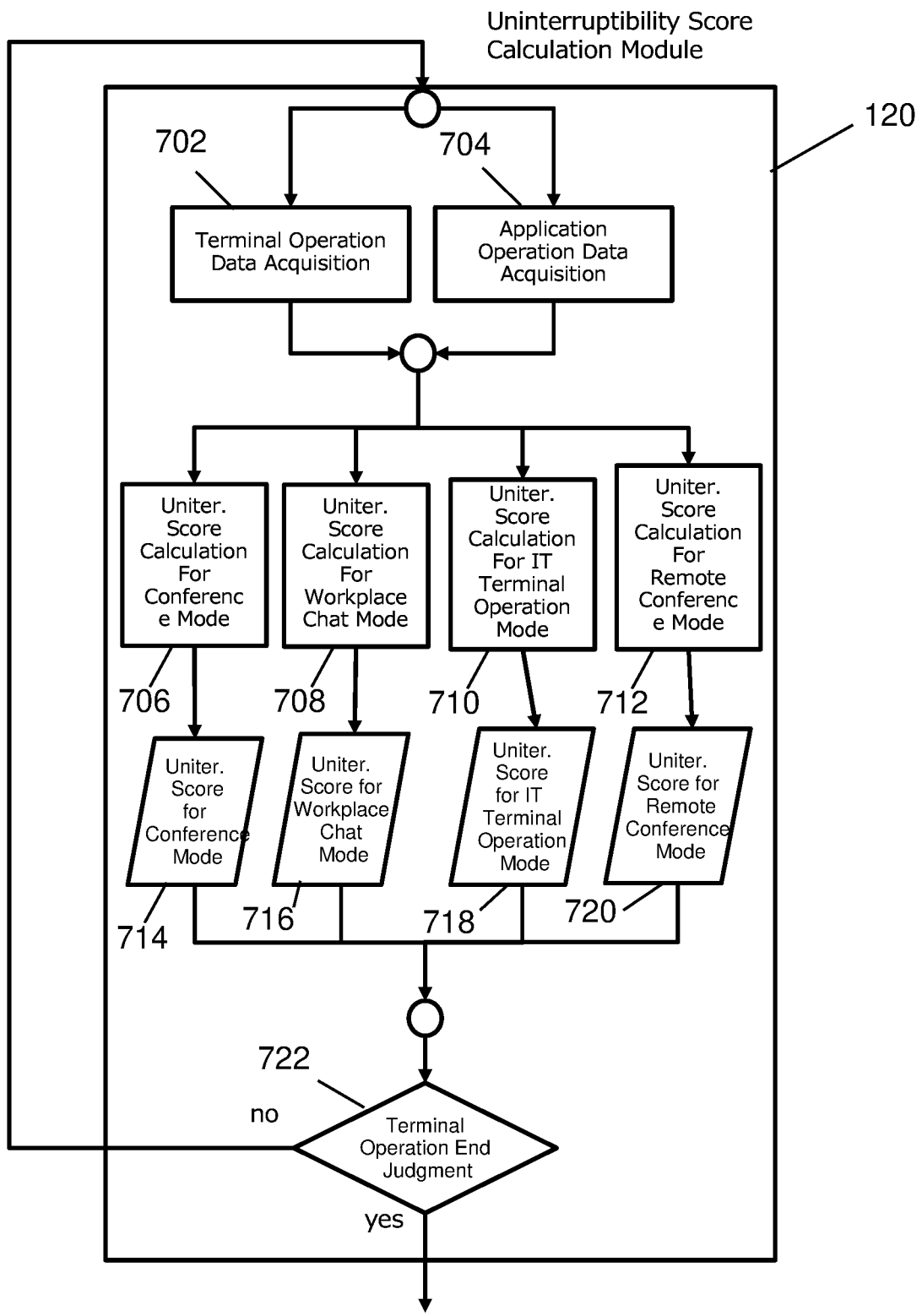
FIG. 8 shows a block diagram of an exemplary environment in accordance with aspects of the invention.
Figure 9:
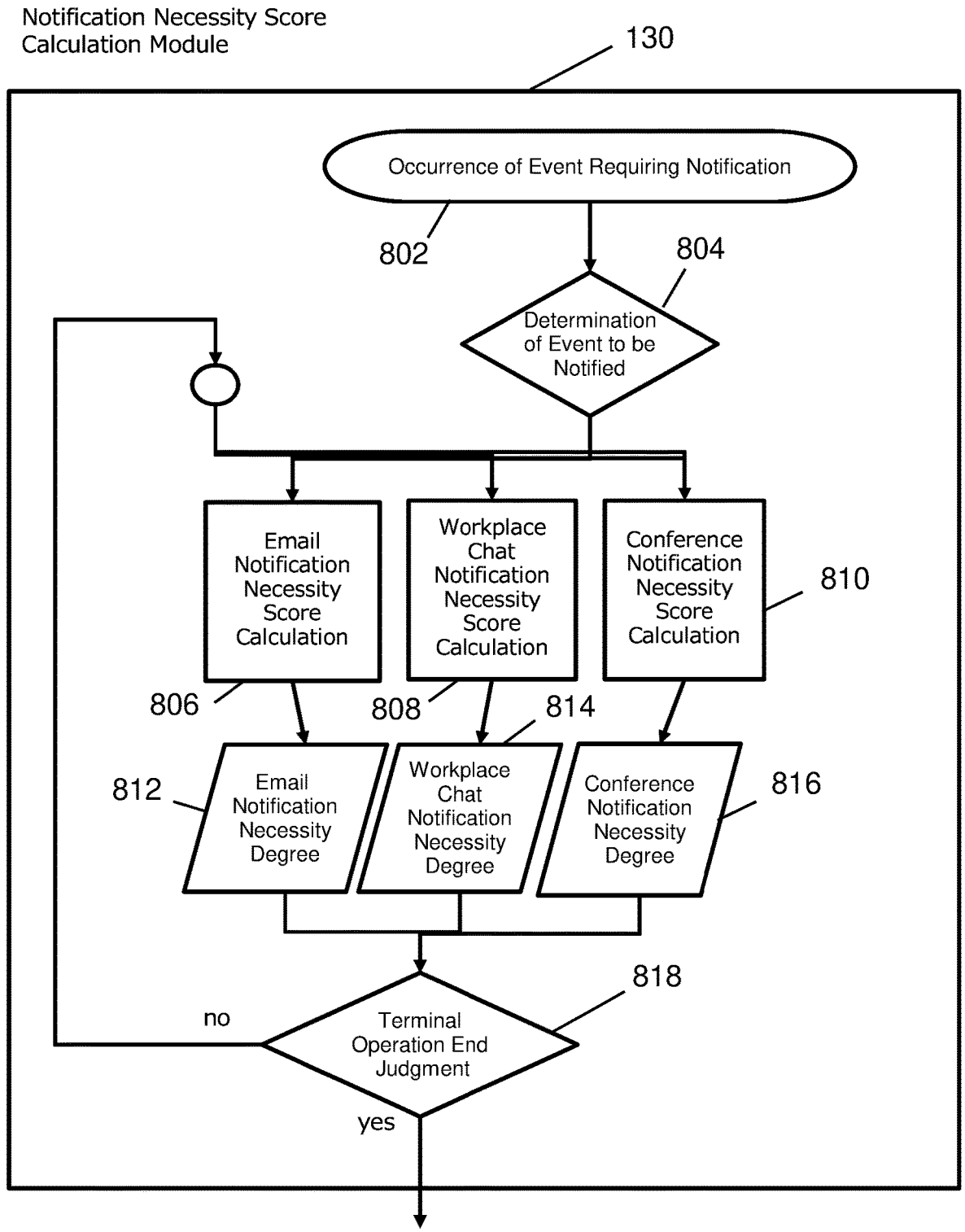
FIG. 9 shows a block diagram of an exemplary environment in accordance with aspects of the invention.
Figure 10:
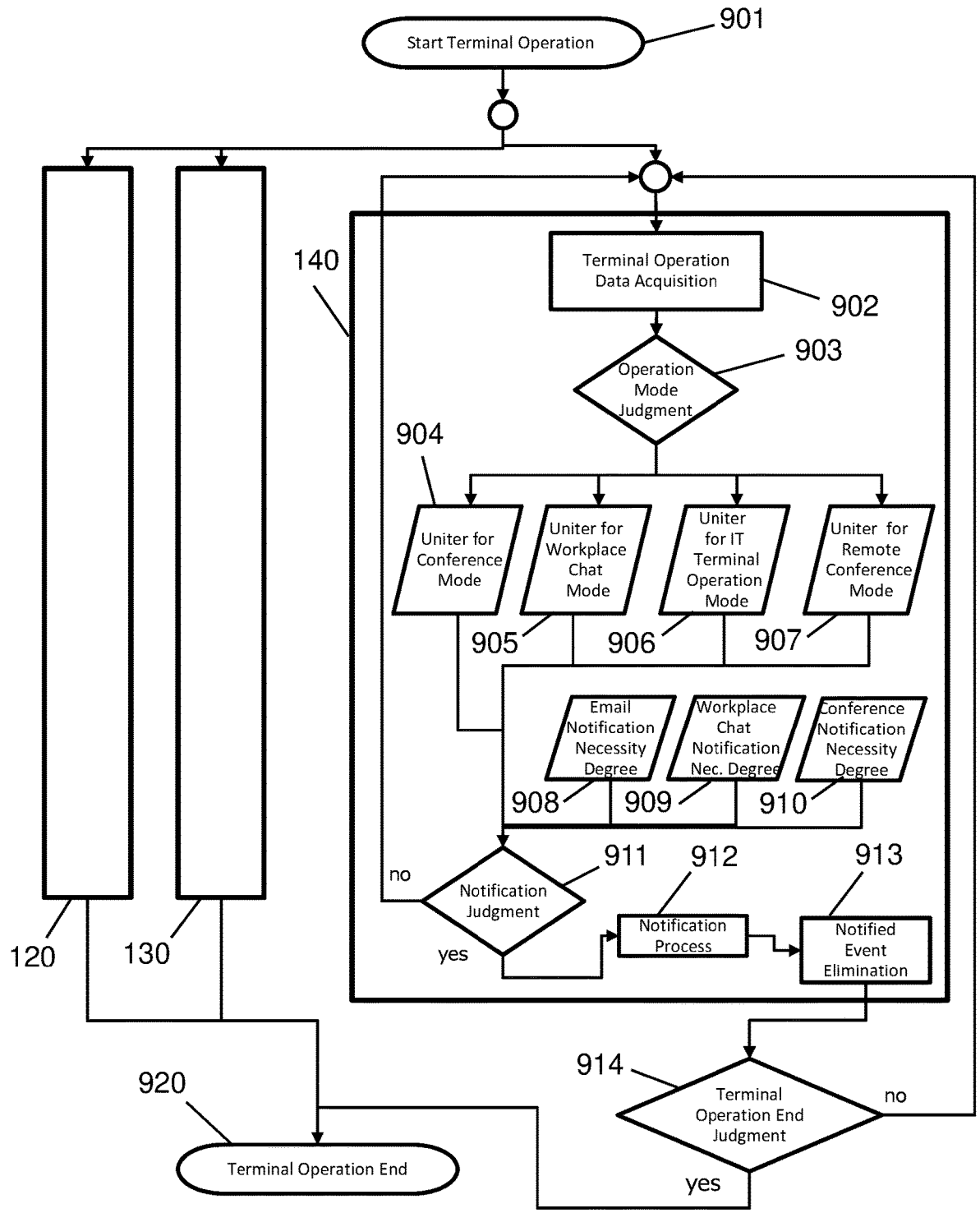
FIG. 10 shows a block diagram of an exemplary environment in accordance with aspects of the invention.

FIGS. 8, 9 and 10 show an example of an operational flow in accordance with embodiments of the invention. In FIG. 8, based on operations on an IT terminal (such as, for example, IT terminal 300) and application operation data, uninterruptibility score calculation module 120 periodically (or continuously) executes uninterruptibility calculations for operation modes in parallel while the IT terminal is being operated. In FIG. 9, notification necessity score calculation module 130 starts the notification necessity calculation for a calculation target notification when a notification target event occurs. The notification necessity calculation is continuously executed during operation of the IT terminal until a target notification is given. In FIG. 10, notification judgment module 140 makes an IT terminal operation mode judgment at each timing (periodically or continuously), and makes the notification judgment based on the uninterruptibility for the relevant IT terminal mode and notification necessity data. In embodiments, when a target notification is notified, the notification event is eliminated and deleted from notification necessity calculations and notification judgment targets.

An exemplary uninterruptibility score calculation is disclosed with reference to FIG. 8. A level at which a sent notification does not disturb a worker's concentration is defined based on a plurality of pieces of information showing various work states (modes) of the worker. A high uninterruptibility state means a state in which the worker desires that his/her concentration not be disturbed. It can be difficult to define a worker's notification tolerance degree with regard to concentration based on a single work event. The notification tolerance degree rather accumulatively changes according to situations of a plurality of works (multi-tasking). In embodiments, "work to which most importance is attached" among a plurality of works (multi-tasking) is practically defined as "main work". In embodiments, a plurality of states (modes) of this "main work" are defined, and an assumed work interruption tolerance level is calculated for each mode.

In the example shown in FIG. 8, four work modes are shown as calculation target "work modes". However, work modes are not restricted to the four modes shown in FIG. 8. In FIG. 8, at 702, uninterruptibility score calculation module 120 acquires terminal operation data from, for example, terminal operation acquisition agent 310. At 704, uninterruptibility score calculation module 120 acquires application operation data from, for example, application operation plug-in 320. At 706, uninterruptibility score calculation module 120 calculates an uninterruptibility score 714 for conference mode if IT terminal 300 is in conference mode. At 708, uninterruptibility score calculation module 120 calculates an uninterruptibility score 716 for workplace chat mode if IT terminal 300 is in workplace chat mode. At 710, uninterruptibility score calculation module 120 calculates an uninterruptibility score 718 for IT terminal operation mode if IT terminal 300 is in IT terminal operation mode. At 712, uninterruptibility score calculation module 120 calculates an uninterruptibility score 720 for remote conference mode if IT terminal 300 is in remote conference mode. At 722, uninterruptibility score calculation module 120 determines whether an indication that the terminal operation should end has been received from notification judgment module 140. If an indication that the terminal operation should end has been received (yes), then processing continues to 920 (FIG. 10) where the terminal operation ends. If an indication that the terminal operation should not end has been received (no), then processing continues to 702, 704 where the cycle is repeated.

In embodiments, uninterruptibility score calculation module 120 recalculates weighting of change in uninterruptibility for work and change in uninterruptibility for the event as parameters related to the uninterruptibility score change. Uninterruptibility score calculation module 120 weights change in uninterruptibility due to each work by a worker during implementation of the work according to content of the work the worker is executing. Therefore, different weighting is defined for change in the uninterruptibility for work for each work mode, and change in the uninterruptibility to which the weighting is added is calculated.

In embodiments, uninterruptibility score calculation module 120 calculates change in uninterruptibility for the event. In embodiments, change in the uninterruptibility does not uniquely depend on each work item that the worker executes, but changes according to a series of situations of work by the worker. Therefore, in embodiments, an hourly statistical change in the work situation of the worker is calculated to calculate change in the uninterruptibility level. Specifically, in embodiments, work that influences the uninterruptibility is defined, and, by calculating the uninterruptibility score based on a situation of a moving average of occurrence situations (based on occurrence/non-occurrence for each unit time), a numerical value corresponding to change in the uninterruptibility level of the worker is calculated by uninterruptibility score calculation module 120.

Uninterruptibility for Conference (Remote Conference) Work Mode

In embodiments, uninterruptibility in a remote conference changes mainly by detecting the following three conference states where timings of the detections are times when change occurs in the degree of concentration on the conference: at the time of switching an operation in the conference such as a physical change (at the time of switching of a person projected on the screen); at the time of switching a theme in the conference; and change in the concentration degree under the same theme in the conference.

Switching screen sharing on the IT terminal is enabled by state detection by a remote conference tool such as, for example, conference tool 612 in FIG. 7. Uninterruptibility is decreased by screen projection switching by conference tool 612. In embodiments, uninterruptibility score calculation module 120 detects logical switching by the following method: statements in the conference are converted to text by voice recognition; the statements are matched with text (stored in a database) corresponding to theme switching (such as, for example, "Changing the subject". "Let's get down to business", or the like) is performed; and uninterruptibility is decreased in the case of being matched.

Embodiments determine that a change in concentration occurs due to a change in the event or meeting state. In embodiments, uninterruptibility score calculation module 120 determines change in concentration degree by how often the user hears his name in the conference. A user tends to concentrate more when the user hears their name more frequently. A user tends to concentrate less when the user hears their name less frequently.

In embodiments, input situations that influence uninterruptibility in a remote conference are divided into the three categories shown in table 1000 in FIG. 11. In embodiments, uninterruptibility score calculation module 120 calculates an appropriate uninterruptibility score according to a state of a worker. In embodiments, uninterruptibility score calculation module 120 categorizes input information about work aspects to be targeted by uninterruptibility management, calculating uninterruptibility corresponding to a transforming characteristic of uninterruptibility for each category, and integrating calculated uninterruptibilities.

Category 1 in FIG. 11 is uninterruptibility of a whole conference. For uninterruptibility indicating a state of the whole conference, a value calculated by moving averages of situations of statements (by persons other than the user) and changes in a projected screen per time slot is adopted. In one example, uninterruptibility score calculation module 120 calculates uninterruptibility of a whole conference by taking a simple moving average (SMA) of occurrences of statements by persons other than the user and/or changes in the projected screen. In embodiments, an SMA is a technique for smoothing time series data (more generally, series data not limited to time series). In the above example, uninterruptibility score calculation module 120 discretely measures the state of speech by the person per hour and the state of screen projection, and calculates the degree of rejection. In embodiments, as comments and screen projections indicating the status of meetings at sampling are generated digitally, moving refunds are used as one of the statistical methods to obtain continuous changes in rejection rates over time. In addition, although the present calculation shows a simple moving average, other embodiments use other leveling methods.

Category 2 in FIG. 11 is an item influencing uninterruptibility based on a change in conference state (switching of person projected on the screen, or detection of a keyword related to a change in theme of the conference). As a characteristic of uninterruptibility based on change in a conference state, embodiments immediately transition to an acceptance state (accepting the notification) if an effective input corresponding to this item occurs. In embodiments, immediately after the effective input corresponding to the relevant item ends, the responsive state tends to continue for a certain period of time. Therefore, after the relevant input is disabled, the operation is such that the uninterruptibility gradually increases. In other words, the operations of decrease in the uninterruptibility due to enablement of the relevant input and increase during disablement are operations having hysteresis. Furthermore, when randomness is recognized in content of conversations in a conference, it is desirable that change in uninterruptibility depends on a probability distribution of continuation of a conversation theme. Graph 1299 in FIG. 12 shows uninterruptibility immediately dropping to a minimum as a result of an event such as a change in projected screen or detection of a keyword indicating a change in conference theme, and then a gradual rise in uninterruptibility after such events.

Category 3 in FIG. 11 is an item of uninterruptibility related to the user. Examples of such items are the occurrence of a statement by the user, and detection of the user's name. Embodiments immediately transition to a complete rejection state if an effective input corresponding to this item occurs. In embodiments, while the relevant effective input continues, the complete rejection is continued. Immediately after the effective input corresponding to the relevant item ends, the state in which the user needs to continue rejection of notifications tends to continue for a certain period of time. Therefore, after the relevant input is disabled, the operation is such that the uninterruptibility gradually decreases. In other words, the operations of increase in the uninterruptibility due to enablement of the relevant input and decrease during disablement are operations having hysteresis. For the decreasing change in the uninterruptibility in this case also, more appropriate calculation of change in uninterruptibility is enabled by causing the change to be change based on probability distribution. Graph 1399 in FIG. 13 shows uninterruptibility immediately increasing to a maximum as a result of a statement being made by the user and remaining at the maximum level while the user is making the statement. Graph 1399 also shows uninterruptibility immediately increasing to a maximum as a result of detection of the user's name and then gradually decreasing afterward.

A reason why it is important to detect a participant's (user's) name is that when a participant's name is mentioned during a meeting, it is a time when the participant needs to concentrate and listen to what is said. When a participant's name occurs during a meeting, the participant is called, or the participant is dealing with a largely relevant subject in the meeting. Therefore, the detection of participant names is highly relevant to concentration.

An integrated uninterruptibility is based on the uninterruptibilities (1) to (3) in FIG. 11 having their respective characteristics and is a combination of the uninterruptibilities. In an exemplary embodiment, the integrated uninterruptibility is calculated by the following calculation: Integrated uninterruptibility=Max (Min (uninterruptibility (1), uninterruptibility (2)), uninterruptibility (3)).

Uninterruptibility for IT Terminal Work Mode

In embodiments, IT terminal work includes various kinds of e-mail works and various kinds of documentation works such as document creation. Representative applications used for documentation work are application software such as word processing, spreadsheets, and presentation software. In comparison with a remote conference and workplace chat (described below), change in the uninterruptibility level in the IT terminal work mode is characterized in that there is a strong possibility that the worker is concentrating at a time when an event (typing, opening/closing files) on the worker's IT terminal does not occur. In embodiments, calculation of the uninterruptibility level in the IT work terminal mode are opposite to the calculation for the remote conference and workplace chat modes. Specifically, the default uninterruptibility of the worker is set high; an event that decreases the tolerance degree is defined; and the uninterruptibility level is determined by a moving average of occurrence of this event per unit time. In embodiments, in the IT terminal work mode, a phase of a target object and the uninterruptibility level have a tendency shown in tables 1499 of FIG. 14.

It can be difficult to directly detect a state of work on an IT terminal because this type of work includes thinking. Therefore, in embodiments, events corresponding to object open (work start) and object close (work end) are detected as triggers for change in uninterruptibility level in IT work mode and used for calculation of change in uninterruptibility with elapsed time.

Figure 15:
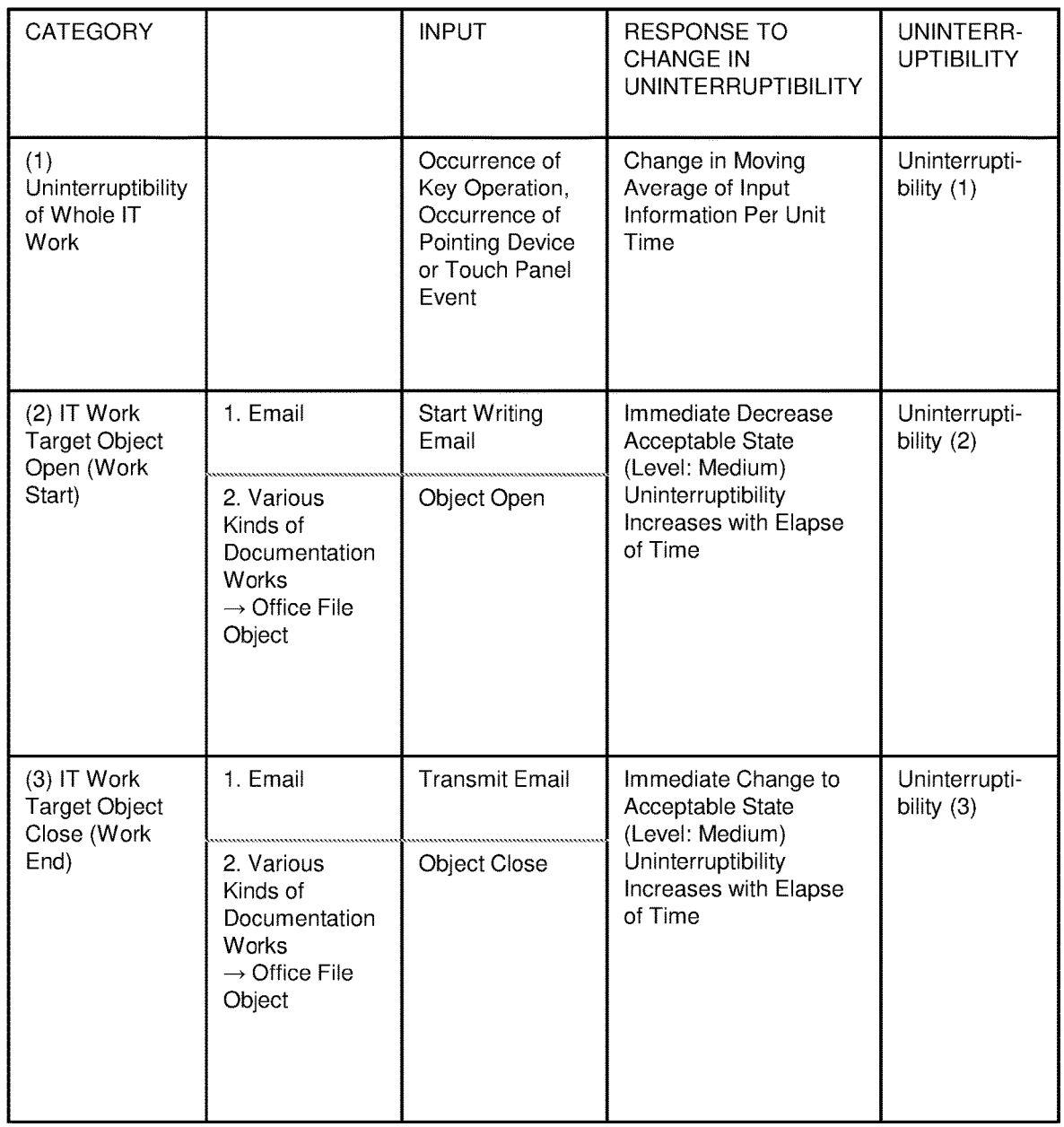
FIG. 15 shows a chart of uninterruptibility in accordance with aspects of the invention.

In embodiments, input situations that influence uninterruptibility in IT work mode are divided into the three categories shown in table 1100 in FIG. 15. In embodiments, uninterruptibility score calculation module 120 calculates an appropriate uninterruptibility score according to a category of IT work being performed by the user.

Category 1 in FIG. 15 is uninterruptibility of whole IT work. For uninterruptibility indicating a state of the whole IT work, a value calculated by moving averages of situations of occurrences of keyboard strokes, pointing device movement, and touch pad operation (for example) within a unit time is adopted. In one example, uninterruptibility score calculation module 120 calculates uninterruptibility of a whole IT work by taking an SMA of occurrences of keyboard strokes, pointing device movement, and touch pad operation.

Categories 2 and 3 in FIG. 15 are opening and closing target objects. The uninterruptibility tends to immediately change when an event corresponding to IT object open or close occurs. Further, immediately after the effective input corresponding to the item ends, the uninterruptibility tends to continue for a certain period of time. Therefore, after the input is disabled, the operation is such that the uninterruptibility gradually increases. In embodiments, the level of change of the uninterruptibility differs between opening an object and closing the object.

An integrated uninterruptibility is based on the uninterruptibilities (1) to (3) in FIG. 15 having their respective characteristics and is a combination of the uninterruptibilities. In an exemplary embodiment, the integrated uninterruptibility is calculated by the following calculation: Integrated uninterruptibility=Min (uninterruptibility (1), uninterruptibility (2), uninterruptibility (3)).

Uninterruptibility for Remote Training Work Mode

Embodiments calculate an uninterruptibility score for a remote training work mode. In the remote training work mode, the uninterruptibility level is set to high since it is not desirable for a user to receive notifications during training. In embodiments, when the remote training work mode is ended, accumulated notifications are provided to the user immediately.

Uninterruptibility for Workplace Chat Work Mode

The workplace chat work mode is characterized in being responsive to responses. However, unlike a telephone conversation in which a communication counterpart is constantly bound to the conversation, a communication counterpart is not constantly bound to a workplace chat. A state with a high uninterruptibility in the workplace chat work mode is a state in which responses are repeated at a certain frequency for a short period of time for a particular counterpart or channel like a telephone conversation. Such a state can be identified as a state in which a workplace chat worker is working, concentrating on the workplace chat communication.

On the other hand, since workplace chat does not tie the communication counterpart side, responses on the counterpart side may be in a slow and discrete response mode. Such a case can be identified as a case where the workplace chat worker is not concentrating on workplace chat processing but is using workplace chat as one of applications during multi-tasking.

In embodiments, uninterruptibility score calculation module 120 calculates the uninterruptibility level specifically by calculating presence/absence of a statement on a workplace chat and presence/absence of screen change for each unit time and calculating a moving average of numerical values obtained by weighting the presence/absence of each event. In the case of an event that decreases the tolerance degree, the occurrence is negatively weighted to perform the calculation. In embodiments, a state of high uninterruptibility is a case where a workplace chat transmission has a high frequently performed for a certain period of time. In embodiments, a state of decrease in uninterruptibility is a case where a workplace chat transmission has a low frequently performed for a certain period of time, or a change in chat channel. Furthermore, similarly to uninterruptibility in a conference, embodiments implement acquisition of workplace chat messages and change in uninterruptibility based on a particular message, as a characteristic of an implementation method. In embodiments, text indicating an end of communication, such as for example, "Now" and "Bye", is stored in a database (for example), and uninterruptibility is decreased when such a message is sent. Further, in embodiments, switching between chats in a workplace chat application is used as a trigger for bringing about change in uninterruptibility.

Figure 16:
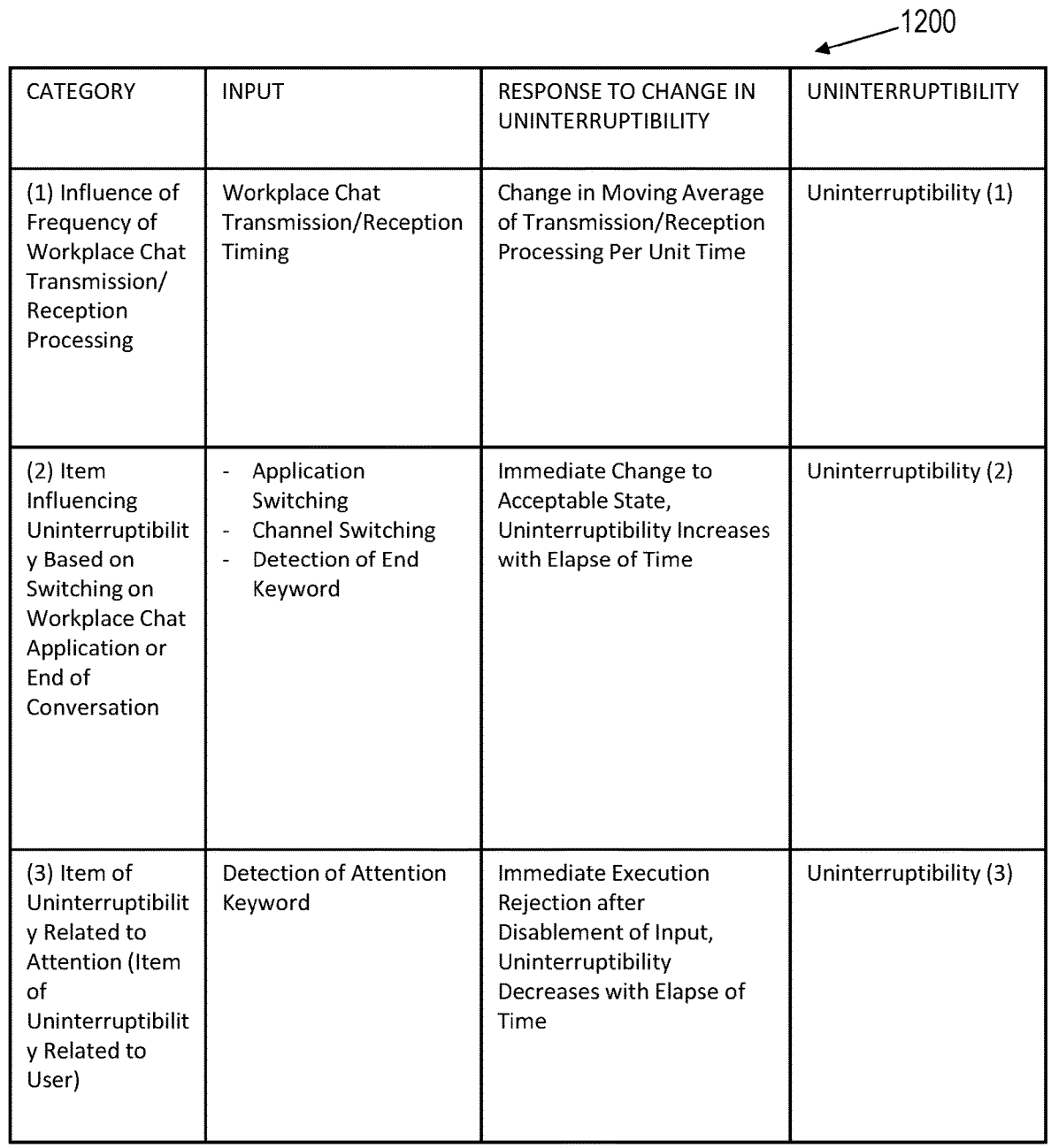
FIG. 16 shows a chart of uninterruptibility in accordance with aspects of the invention.

In embodiments, input situations that influence uninterruptibility in a workplace chat are divided into the three categories shown in table 1200 in FIG. 16. In embodiments, uninterruptibility score calculation module 120 calculates an appropriate uninterruptibility score according to input related to the workplace chat. In embodiments, uninterruptibility score calculation module 120 categorizes input information about aspects to be targeted by uninterruptibility management, calculating uninterruptibility corresponding to a transforming characteristic of uninterruptibility for each category, and integrating calculated uninterruptibilities.

Category 1 in FIG. 16 is uninterruptibility by frequency of workplace chat transmission/reception processing. In embodiments, uninterruptibility score calculation module 120 calculates, for the uninterruptibility by frequency of workplace chat transmission/reception processing, a value by a moving average of the number of executions of workplace chat transmission/reception per time slot. In embodiments, uninterruptibility by frequency of workplace chat transmission/reception processing=SMA of (the number of times of workplace chat transmission/reception).

Category 2 in FIG. 16 is uninterruptibility on an item influencing uninterruptibility based on witching on a workplace chat application, or ending a conversation. As a characteristic of uninterruptibility based on a workplace chat operation or conversation, in embodiments, uninterruptibility score calculation module 120 immediately transitions to a rejection state as a result of an effective input corresponding to this item. In embodiments, immediately after the effective input corresponding to the relevant item ends, the responsive state tends to continue for a certain period of time. Therefore, in embodiments, as shown in graph 1799 in FIG. 17, uninterruptibility score calculation module 120, after the relevant input is disabled, gradually increases the uninterruptibility. In other words, the operations of decrease in the uninterruptibility due to enablement of the relevant input and increase during disablement are operations having hysteresis.

Category 3 in FIG. 16 is uninterruptibility related to attention (item of uninterruptibility related to the user). As a characteristic of uninterruptibility related to a user, in embodiments, uninterruptibility score calculation module 120 immediately transitions to a complete rejection state if an effective input corresponding to this item occurs. While the relevant effective input continues, the complete rejection is continued. In embodiments, immediately after the effective input corresponding to the relevant item ends, the state in which the user wants to continue rejection tends to continue for a certain period of time. Therefore, after the relevant input is disabled, the operation is such that uninterruptibility score calculation module 120 gradually decreases the uninterruptibility. In other words, the operations of increase in the uninterruptibility due to enablement of the relevant input and decrease during disablement are operations having hysteresis.

An integrated uninterruptibility is based on the uninterruptibilities (1) to (3) in FIG. 16 having their respective characteristics and is a combination of the uninterruptibilities. In an exemplary embodiment, the integrated uninterruptibility is calculated by the following calculation: Integrated uninterruptibility=Max (Min (uninterruptibility (1), uninterruptibility (2)), uninterruptibility (3)).

An exemplary notification necessity score calculation is disclosed with reference to FIG. 9. At 802, notification necessity score calculation module 130 detects an occurrence of an event requiring notification of the user. At 804, notification necessity score calculation module 130 determines the type of the notification (for example, email, workplace chat, conference). At 806, notification necessity score calculation module 130 calculates an email notification necessity score if the event is an email. At 808, notification necessity score calculation module 130 calculates a workplace chat notification necessity score if the event is a workplace chat. At 810, notification necessity score calculation module 130 calculates a conference notification necessity score if the event is a conference. At 812, notification necessity score calculation module 130 determines an email notification necessity degree if the event is an email. At 814, notification necessity score calculation module 130 calculates a workplace chat notification necessity degree if the event is a workplace chat. At 816, notification necessity score calculation module 130 calculates a conference notification necessity degree if the event is a conference. At 818, notification necessity score calculation module 130 determines whether an indication that the terminal operation should end has been received from notification judgment module 140. If an indication that the terminal operation should end has been received (yes), then processing continues to 920 (FIG. 10) where the terminal operation ends. If an indication that the terminal operation should not end has been received (no), then processing continues to 806, 808, 810 where the cycle is repeated.

In embodiments, a degree of notification necessity changes according to a plurality of attributes and characteristics about the notification. Therefore, in embodiments, notification necessity score calculation module 130 calculates the degree of notification necessity based on attributes of each notification to use the degree of notification necessity for calculation of a notification timing.

In embodiments, attributes of the notification influence the value of a notification necessity score. Examples of attributes include the notification sender and type of notification (email, workplace chat, conference). In embodiments, a state of necessity based on the notification sender is as follows: clients and superiors have a high necessity; internal members have a medium necessity; and external persons other than clients is low. In embodiments, a state of necessity is high as a result of the notification being marked urgent.

In embodiments, the notification necessity level is not fixed according to a notification type but changes with elapsed time. In embodiments, notification necessity score calculation module 130 defines and calculates a change in notification necessity with elapsed time to utilize the change for calculation of timing of presentation of the notification. Table 1300 in FIG. 18 shows that notification necessity increases with time for an email, and that the change with time is gradual. Table 1300 in FIG. 18 shows that, for a workplace chat, notification necessity is highest when a notification regarding a workplace chat is received and decreases with time, and that the change with time is abrupt. Table 1300 in FIG. 18 shows that, for a conference notification, notification necessity increases with time until the start of the conference, and that the change with time is gradual.

Figure 19:
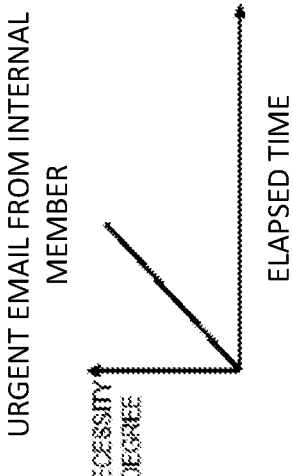
FIG. 19 shows a graph of necessity degree in accordance with aspects of the invention.
Figure 20:
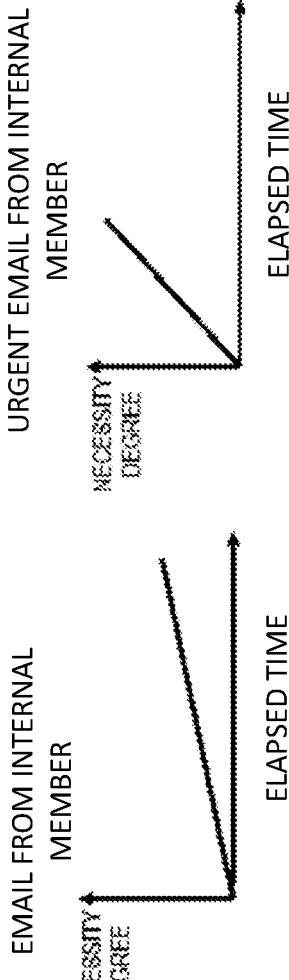
FIG. 20 shows a graph of necessity degree in accordance with aspects of the invention.
Figure 21:
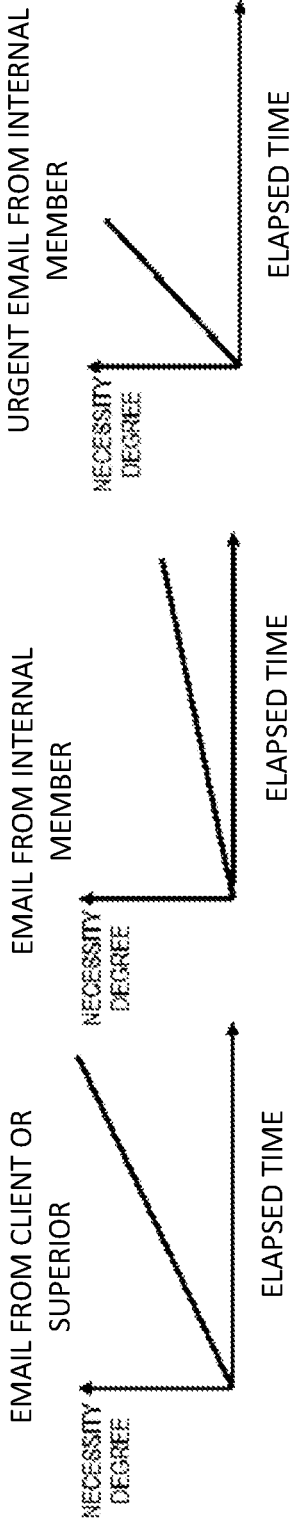
FIG. 21 shows a graph of necessity degree in accordance with aspects of the invention.
Figure 22:
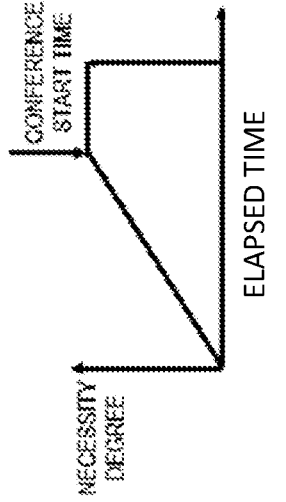
FIG. 22 shows a graph of necessity degree in accordance with aspects of the invention.
Figure 23:
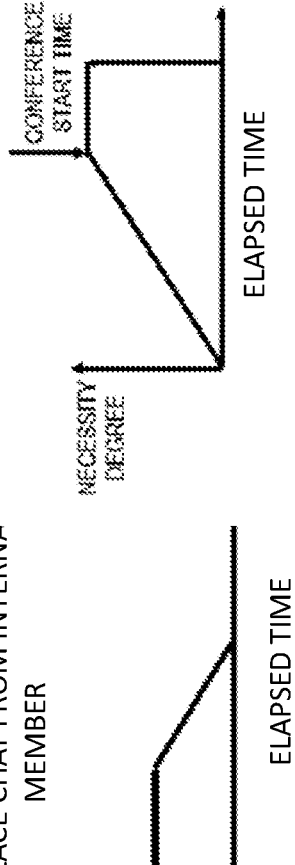
FIG. 23 shows a graph of necessity degree in accordance with aspects of the invention.
Figure 24:
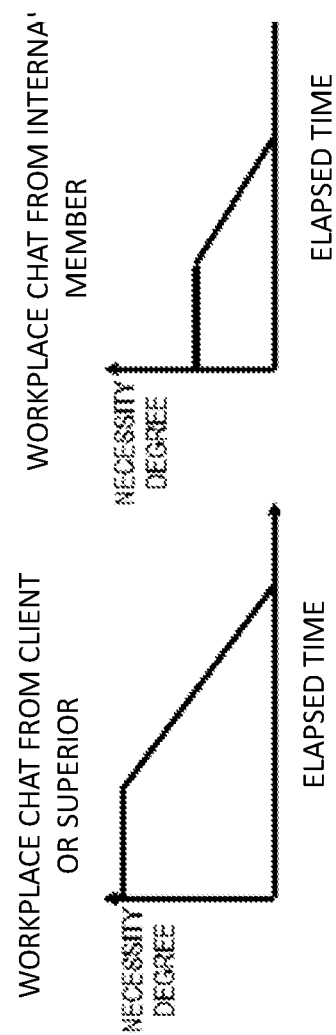
FIG. 24 shows a graph of necessity degree in accordance with aspects of the invention.

FIGS. 19-24 show examples of necessity degree (change) relative to elapsed time from receiving a notification. Each of the graphs of FIGS. 19-24 show a linear function for convenience. In embodiments, other functions such as, for example, an n-th function and pareto charts are used. FIG. 19 shows an email from a client or superior. FIG. 20 shows an email from an internal member. FIG. 21 shows an urgent email from an internal member. FIG. 22 shows a workplace chat from a client or superior. FIG. 23 shows a workplace chat from an internal member. FIG. 24 shows a notification regarding a conference. FIGS. 19-24 illustrate how different types of messages from different types of senders have different necessity degree curves.

An exemplary notification judgment is disclosed with reference to FIG. 10. At 901, operation of a terminal, such as, for example IT Terminal 300, being used by a user is started. At 902, notification judgment module 140 acquires terminal operation data from, for example, terminal operation acquisition agent 310. At 903, notification judgment module 140 determines an operation mode of the terminal. At 904, notification judgment module 140 unites the uninterruptibility score and the notification necessity score received from uninterruptibility score calculation module 120 and notification necessity score calculation module 130, respectively, when the notification is a conference. At 905, notification judgment module 140 unites the uninterruptibility score and the notification necessity score received from uninterruptibility score calculation module 120 and notification necessity score calculation module 130, respectively, when the notification is a workplace chat. At 906, notification judgment module 140 unites the uninterruptibility score and the notification necessity score received from uninterruptibility score calculation module 120 and notification necessity score calculation module 130, respectively, when the notification is an IT terminal operation. At 907, notification judgment module 140 unites the uninterruptibility score and the notification necessity score received from uninterruptibility score calculation module 120 and notification necessity score calculation module 130, respectively, when the notification is a remote conference.

At 908, notification judgment module 140 applies the necessity degree for an email notification as shown, for example, in FIGS. 19-21, when the notification is an email. At 909, notification judgment module 140 applies the necessity degree for a workplace chat as shown, for example, in FIGS. 22 and 23, when the notification is a workplace chat. At 910, notification judgment module 140 applies the necessity degree for a conference notification as shown, for example, in FIG. 24, when the notification is a conference.

At 911, notification judgment module 140 determines if the notification should be presented to the user at this point in time. If notification judgment module 140 determines that the notification should not be presented to the user at this point in time, processing continues to 902 and the cycle is repeated. If notification judgment module 140 determines that the notification should be presented to the user at this point in time, processing continues to 912 where the notification is presented to the user. At 913, notification judgment module 140 eliminates the event (notification) from a list of notifications being held for the user pending approval for presentation to the user.

At 914 notification judgment module 140 determines whether the terminal, such as, for example IT terminal 300, is still being operated by the user. If notification judgment module 140 determines that the terminal is still being operated by the user, processing proceeds to 902 and the cycle is repeated for all notifications received by notification module 110. If notification judgment module 140 determines that the terminal is not still being operated by the user, processing proceeds to 920 where the process ends.

Figure 25:
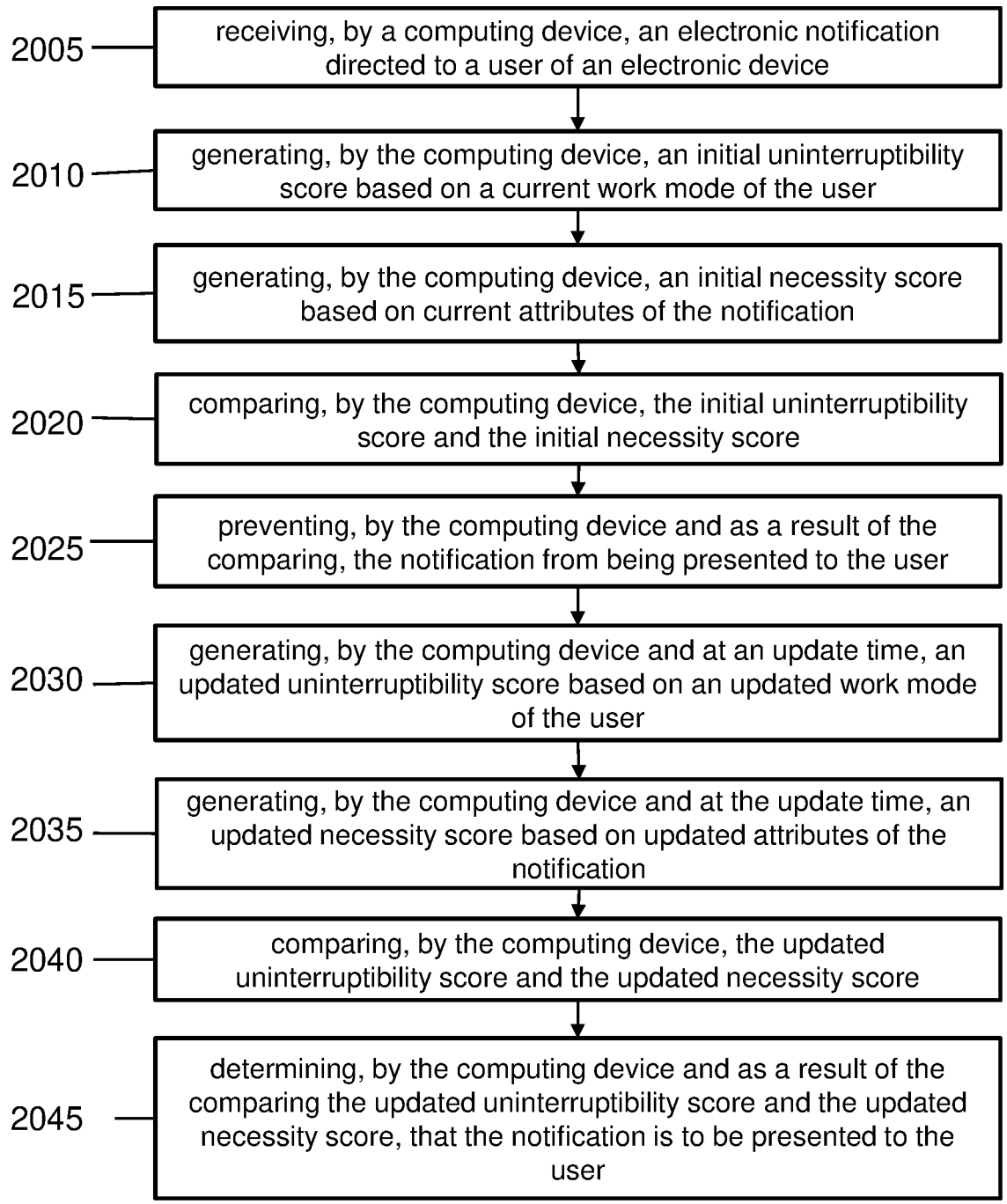
FIG. 25 shows a flow chart in accordance with aspects of the invention.

FIG. 25 shows a flowchart of an exemplary method in accordance with aspects of the present invention. Steps of the method may be carried out in the environment of FIGS. 5 and 7-9 and are described with reference to elements depicted in FIGS. 4 and 7-9.

At step 2005, the system receives, by a computing device, an electronic notification directed to a user of an electronic device. In embodiments, and as described with respect to FIGS. 5 and 8-10, computing device 110 receives an electronic notification directed to a user of IT terminal 300.

At step 2010, the system generates, by the computing device, an initial uninterruptibility score based on a current work mode of the user. In embodiments, and as described with respect to FIGS. 5 and 8-10, uninterruptibility score calculation module 120 generates an initial uninterruptibility score based on a current work mode of the user on IT terminal 300.

At step 2015, the system generates, by the computing device, an initial necessity score based on current attributes of the notification. In embodiments, and as described with respect to FIGS. 5 and 8-10, notification necessity score calculation module 130 generates an initial necessity score based on current attributes of the notification.

At step 2020, the system compares, by the computing device, the initial uninterruptibility score and the initial necessity score. In embodiments, and as described with respect to FIGS. 5 and 8-10, notification judgment module 140 compares the initial uninterruptibility score and the initial necessity score.

At step 2025, the system prevents, by the computing device and as a result of the comparing, the notification from being presented to the user. In embodiments, and as described with respect to FIGS. 5 and 8-10, notification judgment module 140 prevents, as a result of the comparing, the notification from being presented to the user.

At step 2030, the system generates, by the computing device and at an update time, an updated uninterruptibility score based on an updated work mode of the user. In embodiments, and as described with respect to FIGS. 5 and 8-10, uninterruptibility score calculation module 120 generates, at an update time, an updated uninterruptibility score based on an updated work mode of the user.

At step 2035, the system generates, by the computing device and at the update time, an updated necessity score based on updated attributes of the notification. In embodiments, and as described with respect to FIGS. 5 and 8-10, notification necessity score calculation module 130 generates, at the update time, an updated necessity score based on updated attributes of the notification.

At step 2040, the system compares, by the computing device, the updated uninterruptibility score and the updated necessity score. In embodiments, and as described with respect to FIGS. 5 and 8-10, notification judgment module 140 compares the updated uninterruptibility score and the updated necessity score.

At step 2045, the system determines, by the computing device and as a result of the comparing the updated uninterruptibility score and the updated necessity score, that the notification is to be presented to the user. In embodiments, and as described with respect to FIGS. 5 and 8-10, notification judgment module 140 determines, as a result of the comparing the updated uninterruptibility score and the updated necessity score, that the notification is to be presented to the user.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a computing device, an electronic notification directed to a user of an electronic device;
generating, by the computing device, an initial uninterruptibility score based on a current work mode of the user, wherein the current work mode of the user is one of a plurality of work modes, and the work modes include a predefined weighting;
generating, by the computing device, an initial necessity score based on current attributes of the notification;
comparing, by the computing device, the initial uninterruptibility score and the initial necessity score; and
preventing, by the computing device and as a result of the comparing, the notification from being presented to the user.

2. The method of claim 1, further comprising
generating, by the computing device and at an update time, an updated uninterruptibility score based on an updated work mode of the user;
generating, by the computing device and at the update time, an updated necessity score based on updated attributes of the notification;
comparing, by the computing device, the updated uninterruptibility score and the updated necessity score; and
determining, by the computing device and as a result of the comparing the updated uninterruptibility score and the updated necessity score, that the notification is to be presented to the user.

3. The method of claim 2, further comprising permitting, by the computing device and as a result of the determining that the notification should be presented to the user, the notification to be presented to the user.

4. The method of claim 1, further comprising determining the current work mode based on operational data of the electronic device.

5. The method of claim 1, wherein the current attributes of the notification comprise a sender of the notification.

6. The method of claim 1, wherein the current attributes of the notification comprise a type of the notification.

7. The method of claim 6, wherein the type of the notification is at least one selected from the group consisting of: e-mail; workplace chat; and notification of a conference.

8. The method of claim 2, wherein the updated attributes of the notification comprise an amount of time elapsed between generating the initial necessity score and the update time.

9. The method of claim 8, wherein the updated necessity score increases with an increase in the amount of time elapsed.

10. The method of claim 8, wherein the updated necessity score decreases with an increase in the amount of time elapsed.

11. The method of claim 8, wherein the updated necessity score changes relative to the initial necessity score based on the amount of time elapsed, and a rate of the change in updated necessity score changes relative to the initial necessity score is based on the type of the notification.

12. The method of claim 1, further comprising
generating, by the computing device and at an update time, an updated uninterruptibility score based on an updated work mode of the user;
generating, by the computing device and at the update time, an updated necessity score based on updated attributes of the notification;
comparing, by the computing device, the updated uninterruptibility score and the updated necessity score; and
periodically repeating, by the computing device, the generating the updated uninterruptibility score, the generating the updated necessity score, and the comparing until the updated necessity score is larger than the updated uninterruptibility score.

13. The method of claim 12, further comprising determining, by the computing device and as a result of the updated necessity score being larger than the updated uninterruptibility score, that the notification is to be presented to the user.

14. The method of claim 13, further comprising permitting, by the computing device and as a result of the determining that the notification should be presented to the user, the notification to be presented to the user.

15. A computer program product comprising one or more computer readable storage media having program instructions collectively stored on the one or more computer readable storage media, the program instructions executable to:
receive an electronic notification directed to a user of an electronic device;
generate an initial uninterruptibility score based on a current work mode of the user, wherein the current work mode of the user is one of a plurality of work modes, the work modes include a predefined weighting, and the plurality of work modes comprise a conference work mode, an IT terminal work mode, a remote training work mode, and a workplace chat work mode;
generate an initial necessity score based on current attributes of the notification;
compare the initial uninterruptibility score and the initial necessity score;
prevent, as a result of the comparing, the notification from being presented to the user;
generate, at an update time, an updated uninterruptibility score based on an updated work mode of the user;
generate, at the update time, an updated necessity score based on updated attributes of the notification;
compare the updated uninterruptibility score and the updated necessity score; and
periodically repeat the generating the updated uninterruptibility score, the generating the updated necessity score, and the comparing the updated uninterruptibility score and the updated necessity score until the updated necessity score is larger than the updated uninterruptibility score.

16. The computer program product of claim 15, wherein the program instructions are further executable to determine the current work mode based on operational data of the electronic device.

17. The computer program product of claim 15, wherein the current attributes of the notification comprise a type of the notification.

18. A system comprising:
a processor, a computer readable memory, one or more computer readable storage media, and program instructions collectively stored on the one or more computer readable storage media, the program instructions executable to:
receive an electronic notification directed to a user of an electronic device;
generate an initial uninterruptibility score based on a current work mode of the user, terminal operation data of the user, and application operation data, wherein the current work mode of the user is one of a plurality of work modes, the work modes include a predefined weighting, and the plurality of work modes comprise a conference work mode, an IT terminal work mode, a remote training work mode, and a workplace chat work mode;
generate an initial necessity score based on current attributes of the notification;
compare the initial uninterruptibility score and the initial necessity score; and
prevent, as a result of the comparing, the notification from being presented to the user.

19. The system of claim 18, the program instructions being further executable to:
generate, at an update time, an updated uninterruptibility score based on an updated work mode of the user;
generate, at the update time, an updated necessity score based on updated attributes of the notification;
compare the updated uninterruptibility score and the updated necessity score; and
periodically repeat the generating the updated uninterruptibility score, the generating the updated necessity score, and the comparing until the updated necessity score is larger than the updated uninterruptibility score.

20. The system of claim 19, the program instructions being further executable to determine, as a result of the updated necessity score being larger than the updated uninterruptibility score, that the notification is to be presented to the user.

* * * * *